United States Patent
Schuld et al.

(10) Patent No.: US 7,717,371 B2
(45) Date of Patent: May 18, 2010

(54) RESTING DECK IN AN AIRCRAFT WITH RESTING CABINS

(75) Inventors: Michael Schuld, Hamburg (DE); Harry Kwik, Wentorf (DE)

(73) Assignee: Airbus Deutschland GmbH, Hamburg (DE)

( * ) Notice: Subject to any disclaimer, the term of this patent is extended or adjusted under 35 U.S.C. 154(b) by 195 days.

(21) Appl. No.: 11/627,143

(22) Filed: Jan. 25, 2007

(65) Prior Publication Data

US 2007/0170311 A1     Jul. 26, 2007

Related U.S. Application Data

(60) Provisional application No. 60/762,367, filed on Jan. 25, 2006.

(30) Foreign Application Priority Data

Jan. 25, 2006     (DE)     ................ 10 2006 003 585

(51) Int. Cl.
    *B64D 11/00*     (2006.01)
(52) U.S. Cl. .................................. 244/118.5
(58) Field of Classification Search ............. 244/118.5, 244/118.6, 122 R; 297/248; 105/314–316
    See application file for complete search history.

(56) References Cited

U.S. PATENT DOCUMENTS

| | | | |
|---|---|---|---|
| 2,632,408 A | | 3/1953 | Giles |
| 3,677,322 A | | 7/1972 | Brorson et al. |
| 4,185,799 A | | 1/1980 | Richards, Jr. |
| 5,542,626 A | * | 8/1996 | Beuck et al. ............... 244/107 |
| 6,073,883 A | * | 6/2000 | Ohlmann et al. ........ 244/118.5 |
| 6,182,926 B1 | | 2/2001 | Moore |
| 6,257,523 B1 | | 7/2001 | Olliges |
| 6,305,645 B1 | | 10/2001 | Moore |
| 6,464,169 B1 | | 10/2002 | Johnson et al. |

(Continued)

FOREIGN PATENT DOCUMENTS

DE     2234308     2/1973

(Continued)

OTHER PUBLICATIONS

Arturo Weiss, The Airborne Hotel, Aircraft Interiors, Feb. 2003, p. 14.

(Continued)

*Primary Examiner*—Tien Dinh
(74) *Attorney, Agent, or Firm*—Christopher Paradies; Fowler White Boggs P.A.

(57) ABSTRACT

A resting deck in an aircraft with a plurality of side-by-side arranged resting compartments, which are oriented in a special way and manner, in order to make use of the existing space as optimally as possible, and an aircraft, which is equipped with such a resting deck. The resting deck includes a plurality of side-by-side arranged, longitudinally extending resting compartments, which are defined on two, opposite longitudinal sides by a respective separating barrier, which separates adjacent resting compartments from one another, as well as a longitudinal resting surface, which is arranged in each of the plurality of the resting compartments, such that a longitudinal side of the resting surface extends along a longitudinal direction of the separating barrier and a slanting angle between the separating barrier and the fuselage axis in a forward direction is greater than 0° and less than 180°.

6 Claims, 4 Drawing Sheets

U.S. PATENT DOCUMENTS

| | | |
|---|---|---|
| 6,581,876 B2 | 6/2003 | Cheung |
| 6,669,141 B2 * | 12/2003 | Schmidt-Schaeffer .... 244/118.6 |
| 6,848,654 B1 | 2/2005 | Mills et al. |
| 7,188,806 B2 | 3/2007 | Beroth |
| 2004/0232283 A1 * | 11/2004 | Ferry et al. .............. 244/118.6 |
| 2005/0023413 A1 | 2/2005 | Saint-Jalmes |
| 2005/0189451 A1 | 9/2005 | Mercier |
| 2005/0189804 A1 | 9/2005 | Mercier |

FOREIGN PATENT DOCUMENTS

| | | |
|---|---|---|
| DE | 2630210 A1 | 1/1978 |
| DE | 19544754 A1 | 6/1996 |
| EP | 0867365 A2 | 9/1998 |
| GB | 733081 | 7/1955 |
| WO | 80/01156 A1 | 6/1980 |
| WO | 02/28712 A1 | 4/2002 |
| WO | 2005/080196 A1 | 9/2005 |
| WO | 2006/094091 A2 | 9/2006 |

OTHER PUBLICATIONS

Air Transport, Aviation Week & Space Technology, Mar. 6, 2000, p. 40.

Bruce A. Smith, Boeing Revamps 747X Wing Design, Aviation Week & Space Technology, Mar. 12, 2001, p. 42.

Boeing Mulls Huge Cabin, Aviation Week & Space Technology, May 17, 1999, p. 60.

Luftfahrt, Kopf an Kopf, Der Spiegel, Jun. 2000, p. 124.

German Office Action dated Sep. 21, 2009, for corresponding German Application No. 100 59 603, 3 pages.

* cited by examiner

US 7,717,371 B2

RESTING DECK IN AN AIRCRAFT WITH RESTING CABINS

REFERENCED APPLICATIONS

This application claims the benefit of the filing date of U.S. Provisional Patent Application No. 60/762,367 filed Jan. 25, 2006 and of German Patent Application No. 10 2006 003 585.2 filed Jan. 25, 2006, the disclosures of which are hereby incorporated herein by reference

FIELD OF THE INVENTION

The field relates generally to the cabin configuration in aircraft. In particular, the field relates to a resting deck in an aircraft with a plurality of resting compartments "sleeping compartments" arranged side-by-side, which are oriented in a special way and manner, in order to make use of the existing space optimal. Further, the field relates to an aircraft, which is equipped with such a resting deck.

BACKGROUND OF THE INVENTION

Recently, many efforts were undertaken to make available to passengers on extended flights, resting chambers or compartments, into which they may retreat in order to rest during the flight and in the best case, to sleep. In this connection, frequently, beds are arranged longitudinally to the flight or fuselage direction in the crown or top area of the aircraft based on the minimal space available, in order to provide sufficient volume for each sleeping place. These types of arrangements are described, for example, in the U.S. patents with the publication numbers U.S. Pat. No. 6,073,883, 6,182,926, or 6,305,645. With such a longitudinal arrangement of the beds, however, a certain volume generally remains unused between the fuselage in the crown or top region and the sleeping place. Alternatively, in addition, attempts were undertaken to mount the beds in a transverse arrangement in the aircraft fuselage, in which the beds are arranged perpendicular to the flight direction or to the longitudinal axis of the aircraft fuselage. For example, with a transverse arrangement of the beds, in which two rows of beds are spaced from one another by an entry, the volume of the sleeping space in the area of the fuselage is greatly reduced, based on the fuselage cross sectional geometry. In addition, frequently, the entry with such a symmetrical, transverse arrangement of the beds is greatly impaired.

A further disadvantage of the described symmetrical transverse arrangement of the beds in the crown or top region of an aircraft fuselage is that based on available space, the aisle between both rows of beds must be dimensioned to be very narrow, so that not enough space is available either for two passengers passing in the aisle or for dressing or undressing of passengers in the aisle.

A further disadvantage of the described bed arrangement is that they only provide limited privacy, since passengers in opposite sleeping cabins may see into the cabins of their counterparts.

SUMMARY OF THE INVENTION

Based on the problems associated with the previously described bed arrangements, there may be a need providing a realization, with which the space in the interior of an aircraft fuselage may be used most optimally for forming a resting deck with a plurality of resting compartments, whereby simultaneously, an improvement with regard to privacy is provided.

According to one embodiment of the invention, a resting deck in an aircraft, which includes a plurality of side-by-side arranged, longitudinally extending resting compartments, which are defined by two opposite longitudinal sides by a respective separating barrier, which separate adjacent resting compartments from one another. The separating barriers may be formed, for example, as solid walls or however, also as film or curtain. In addition, the resting deck includes a plurality of resting surfaces, which are arranged in the resting compartments, such that a longitudinal side runs in the direction of the separating barrier. In this connection, the individual resting compartments of the plurality of resting compartments with their longitudinal directions are arranged having a slanting angle between a direction parallel to the separating barrier and the longitudinal fuselage axis. With respect to the application, the terms longitudinal direction, longitudinal side, or a longitudinally extending resting compartment refers to the longer dimension of the resting compartment, the resting surface or the aircraft fuselage. Along with this definition, it is likewise the case that the side-by-side arranged resting compartments are arranged relative to one another, such that they are adjacent to one another with their longer sides.

With the described slanted arrangement of the resting compartments in the aircraft fuselage, an almost optimal use of space of the space available in the resting deck may occur, without requiring that the aisle, which may lead to the individual resting compartments, being formed narrowly. This is based on the fact that the individual resting compartments are arranged with their longitudinal axes slanted to the longitudinal axis of the aircraft fuselage, such that the orthogonal extension of the individual cabins to the longitudinal direction of the aircraft fuselage is reduced. As a result, more space remains available in the orthogonal direction to the longitudinal direction of the aircraft fuselage for a possible aisle.

The noted resting surfaces may be simple horizontal floors, which serve on the one hand, for example, for supporting mattresses and on the other hand, simultaneously may form at least partially the underside of the deck over a main passenger cabin viewed from the other side. Since the ceiling region of a passenger cabin, however, usually is equipped with luggage bins (hat racks), the noted resting surfaces would not be formed continuously with the ceiling of the passenger cabin deck located there under, but represents only in partial areas the ceiling for the passenger deck located under the resting deck.

According to an exemplary embodiment, the individual resting compartments with the described slanted arrangement may be slanted in the resting deck, such that a first directional component of their longitudinal direction runs parallel to a longitudinal axis of the aircraft fuselage, which may be the axial direction of a cylindrically shaped fuselage, for example, and a second directional component of its longitudinal direction runs perpendicular to the direction of the aircraft fuselage. Based on the two directional components, an angle of the individual resting compartments may be determined such as any angle between 0° and 180°, from the axial direction of travel of the aircraft. The resting compartments, for example, may have an acute angle with the longitudinal direction of the aircraft fuselage, within a range between 30° and 80°, depending on the fuselage size or width. Other angle ranges may be determined with correspondingly greater or smaller dimensions of the aircraft fuselage. The more space that is available in an aircraft fuselage based on aircraft height and width of the deck, the greater the angle may be between the longitudinal directions of the resting compartments and the longitudinal axis of the aircraft, up to a maximum of 90°, accommodating more compartments in a wider deck. A narrower width may be accomplished by increasing the angle between longitudinal direction of the compartment and the longitudinal axis of the aircraft fuselage at the expense of aisle width or length of the compartment. Thus, a two-four-two seat configuration in the main deck (two outer seating rows each with two seats, which are separated by a respective aisle by a center seating row with four seats), preferably has a resting deck configuration having an angle of about 62°, in order to provide optimal use of space for a comfortable length of rest compartment for many passengers and an aisle of sufficient width to meet safety and comfort guidelines.

In order to make the individual resting compartments of the resting deck easily accessible, according to an exemplary embodiment, in the resting deck, two rows of side-by-side arranged, longitudinally extending sleeping compartments may be arranged, which are separated from one another by an access aisle to the individual resting compartments. This access aisle may be accessible from the main passenger cabin located below the resting deck via a ladder or stairs, so that the passengers may retreat comfortably into the resting deck or the resting compartments located therein. By this design of the resting deck, in which two rows of side-by-side arranged resting compartments are separated from one another by an access aisle, according to an exemplary embodiment, a fishbone-like configuration, when viewed in plan view, is provided, which means that the resting compartments on both sides of the access aisle are arranged at respectively a positive acute angle or a negative acute angle with reference to the longitudinal axis of the aircraft fuselage. For example, if a range of 30° to 80° is chosen for resting compartments based on the length of the compartments selected and the width of the fuselage, then a range of 150° (−30°) to 100°(−80°) from the longitudinal axis in direction of travel provides equivalent space in the compartment but with an entryway facing the rear of the aircraft fuselage.

With a fishbone-like arrangement of the resting compartments, such as shown in FIG. 3, a passenger, who is located in a resting compartment on one side of an access aisle, cannot look directly into the full length of the resting compartment on the opposite side of the access aisle, providing additional privacy to passengers in the individual resting compartments, which may be an advantage over having compartments aligned perpendicular to the longitudinal axis of the aircraft fuselage. One advantage of an example of unitized resting compartments is that such units may be installed as complete units in the resting deck, having front sides facing the access aisle, and defining the access aisle. Thus, no additional walls must be installed, in order to form the access aisle, since this is defined itself by the arrangement of the individual resting compartments.

In order to permit a continuous access aisle without creating a zigzag pattern, according to one example, the front side of each of the resting compartments is arranged complementary at an angle with reference to a longitudinal side of the resting compartment, which relates back to the slanted arrangement of the resting compartments at the same acute angle with regard to the longitudinal direction of the aircraft fuselage, so that all of the resting compartments, in total, define a continuous access aisle. Instead of forming a continuous access aisle, however, according to an exemplary embodiment of the invention, it also may be desirable to partially widen the aisle, so that at these places, two passengers may effortlessly meet or pass one another. According to an exemplary embodiment, the front sides in plan view have at least one angled portion such that in the area of the angled portion, a partial widening of the access aisle can occur. The front side of the resting compartment, therefore, may have sections, which run parallel to the longitudinal direction of the aircraft fuselage and other sections, which even do not run parallel to the longitudinal direction of the aircraft fuselage. Of course, it is likewise possible to provide that the front sides of the resting compartments exclusively have sections that do not run parallel to the longitudinal direction of the aircraft fuselage, so that, when viewed in total, a sawtooth-like lateral definition of the access aisle exists.

In the event that the resting compartments have front sides on both sides of the access aisle, which run parallel to the longitudinal direction of the aircraft fuselage and other sections, which do not run parallel to the longitudinal direction of the aircraft fuselage, in order to form partial aisle widening, the resting compartments should be arranged on both sides of the access aisle so they are not offset to one another, since in this case, otherwise, no aisle widening would exist. Moreover, the aisle along the front sides of the resting compartments would meander in an almost constant width, whereby no available space would exist for widening. In order to prevent this, the resting compartments should be non-offset or arranged in pairs, so that each resting compartment on one side of the access aisle may be associated with another resting compartment on the other side of the access aisle. By this type of arrangement in pairs, the widening will be located on both sides of the access aisle on opposite places of the access aisle, so that at these positions, a quasi-doubled widening of the access aisle exists.

Since the existing available space may be used optimally with the resting deck, according to an exemplary embodiment of the invention, the resting deck may be arranged in the crown or top region of the aircraft, which is located above a main passenger cabin. Of course, it is likewise possible to form such a resting deck section also on the plane of the main passenger cabin or in a lower deck.

In the event that the resting deck is located in the crown or top region, however, according to an exemplary embodiment, an upper surface of the resting surface of each of the plurality components is disposed at a height above the floor of the access aisle. This may be necessary, in that for the resting compartments themselves, only a minimal height may suffice, whereas the access aisle must be dimensioned higher, so that passengers moving through the aisle do not have to stoop over. In addition, by positioning the floor of the access aisle lower than the resting surfaces of the resting compartments, no additional bed frames or the like are required in the resting compartments; in addition, such a bed frame has already been produced, in which the floor of the access aisle is lower relative to the resting surface.

According to an exemplary embodiment, an aircraft is provided, which has an aircraft fuselage, in whose crown or top region above the main passenger cabin, a resting deck is formed, as described in the above passages.

BRIEF DESCRIPTION OF THE FIGURES

Next, exemplary embodiments will be described in greater detail with reference to the accompanying drawings. The exemplary embodiment shown in the drawings serves only for explaining the resting deck and in particular, may not be misconstrued as a limitation on claim scope. In the drawings:

In all of the figures, the same or corresponding elements are designated with the same or corresponding reference numerals. The representations in the figures are deliberately not to scale; however, qualitative dimensional proportions may be inferred.

DETAILED DESCRIPTION

The examples described and drawings rendered are illustrative and are not to be read as limiting the scope of the invention as it is defined by the appended claims.

Figure 1:
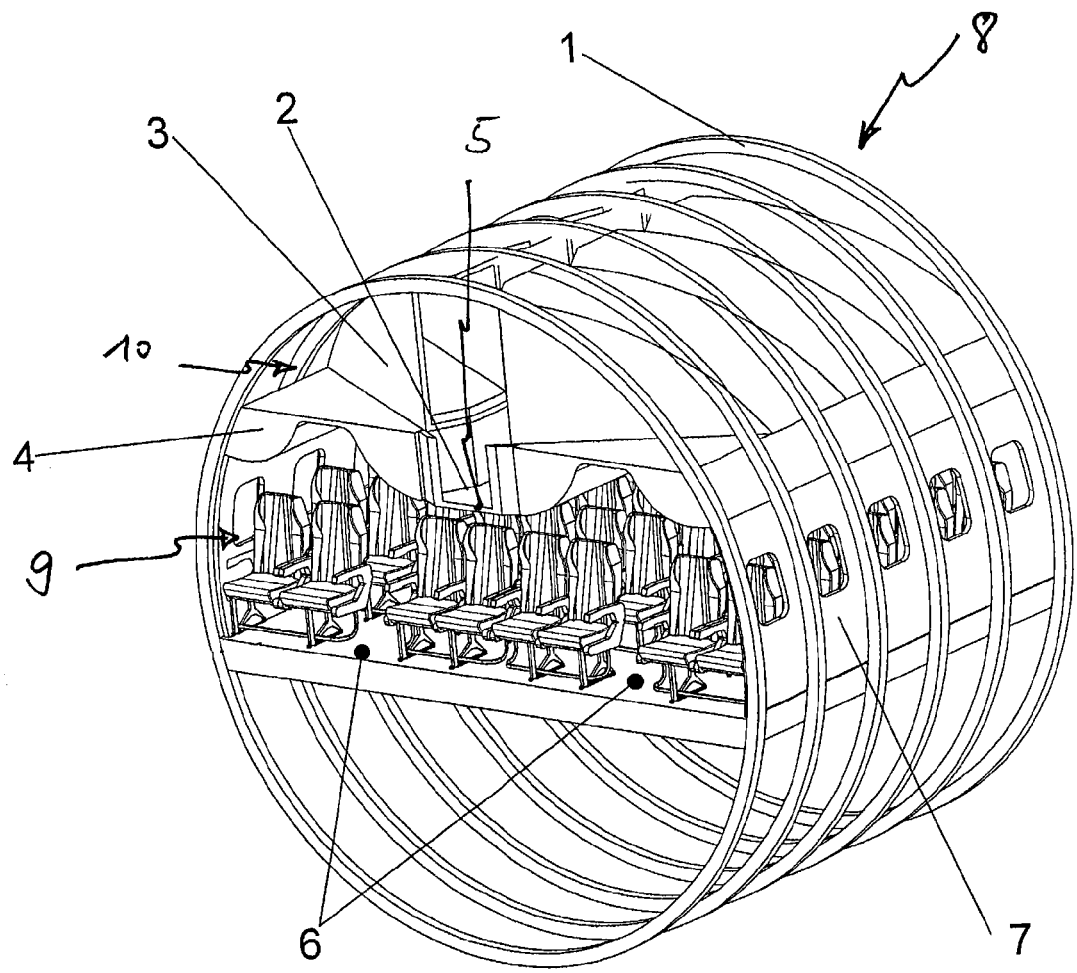
FIG. 1 shows a perspective cross section through an aircraft fuselage with a resting deck disposed in the top region.

FIG. 1 shows a cross section through an aircraft fuselage 8, which is formed substantially by a plurality of frames 1 arranged in a spaced manner in the longitudinal direction of the aircraft fuselage 8, which commonly are covered with an outer skin (not shown here). On the inner side, the frames 1 are provided with a side lining 7 in the area of the main passenger cabin 9, in which in the representation shown here, the seats are arranged in a two-four-two configuration. In the two-four-two configuration, both outer seating rows each with two seats are separated by a longitudinal aisle 6 from the center seating row, which has four seats. Above the so-formed main passenger cabin 9, the seating deck 10 is formed in the crown or top region of the aircraft fuselage 8, whose design will be described subsequently with simultaneous reference to FIGS. 2 through 4 as well as FIG. 1.

Figure 2:
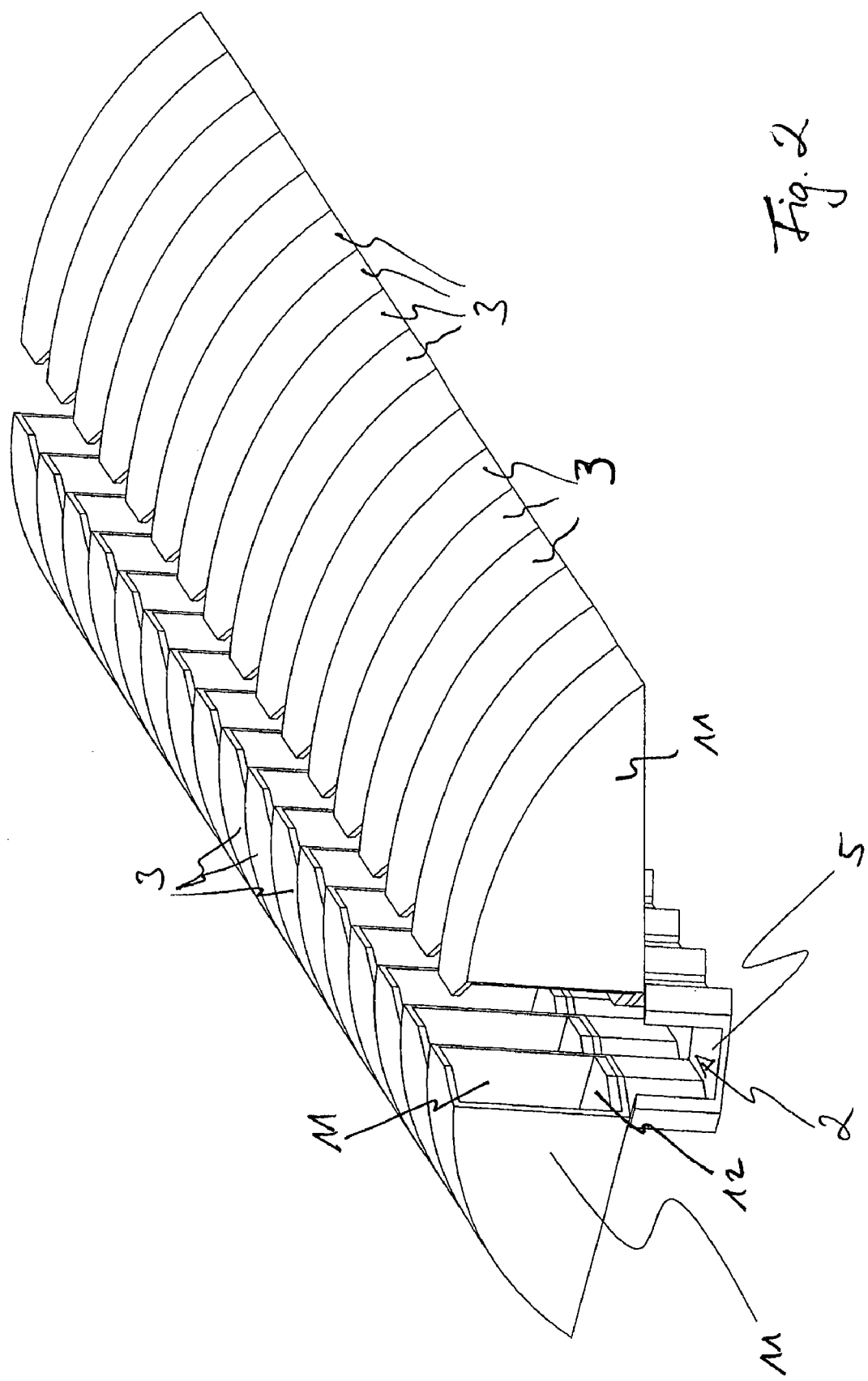
FIG. 2 shows a perspective representation of the resting deck of the present invention, in which the aircraft fuselage was cut away.
Figure 3:
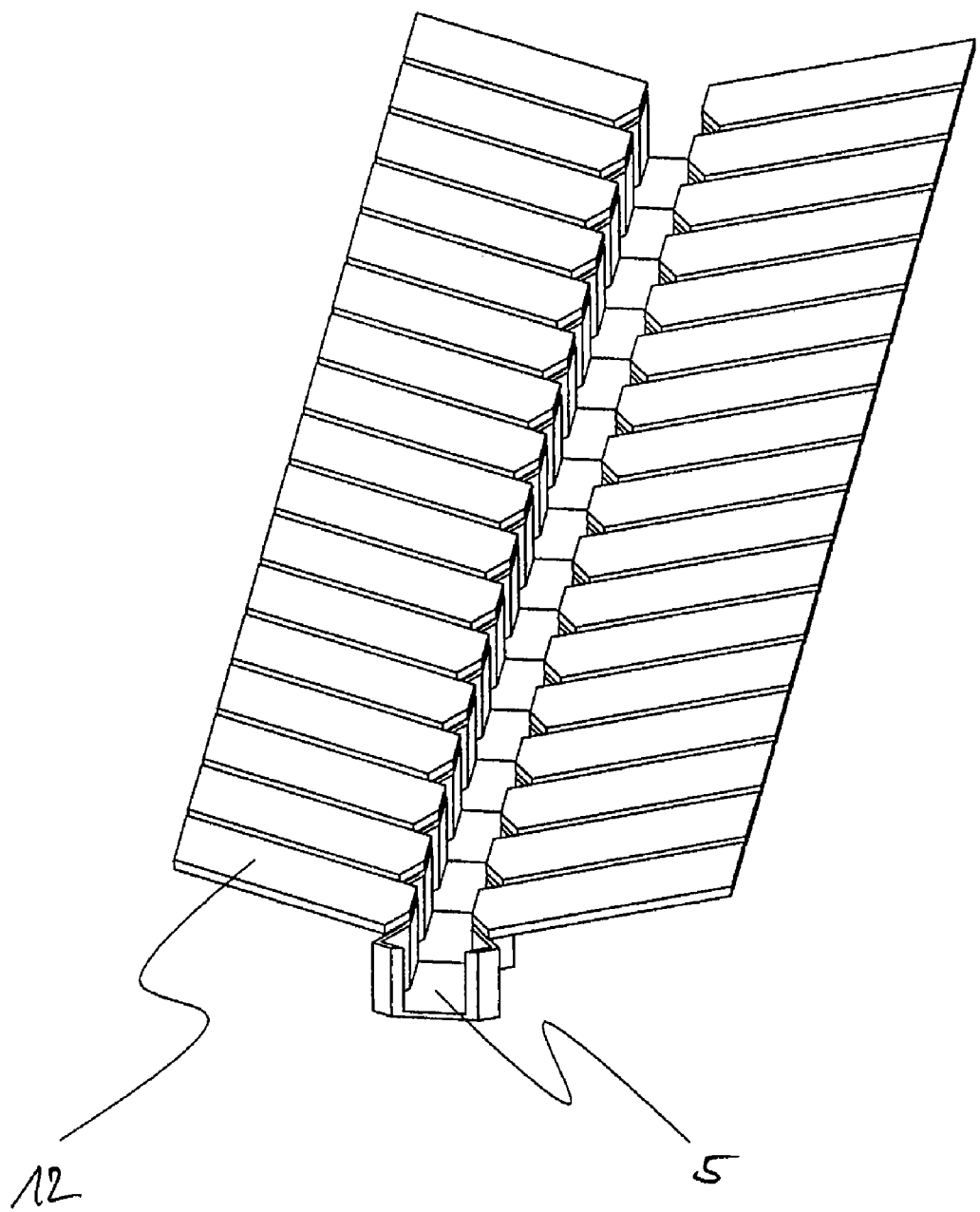
FIG. 3 shows a perspective representation of the resting deck of FIG. 2, in which for a better overview, half of the separating walls of the sleeping compartment are cut away.

As may be seen in particular in FIG. 2, the resting deck 10 is formed from a plurality of resting compartments 3, which are arranged respectively side-by-side to one another. The resting compartments 3 have a longitudinal extension along which they are separated from the respective, adjacent resting compartment 3 with the aid of separating walls 11, whereby the separating walls 11, for example, may be formed as solid walls or also, however, as film or curtains. The separating walls 11 extend therefore from the resting surfaces 12, which extend in a horizontal longitudinal direction to the underside of the resting compartment 3, vertically upward and have a (circular)segmented-like upper form closure, in order to match the inner contour of the fuselage frames 1. Mattresses or other upholstery may be placed on the resting surfaces 12, in order to provide a passenger with adequate comfort.

Figure 4:
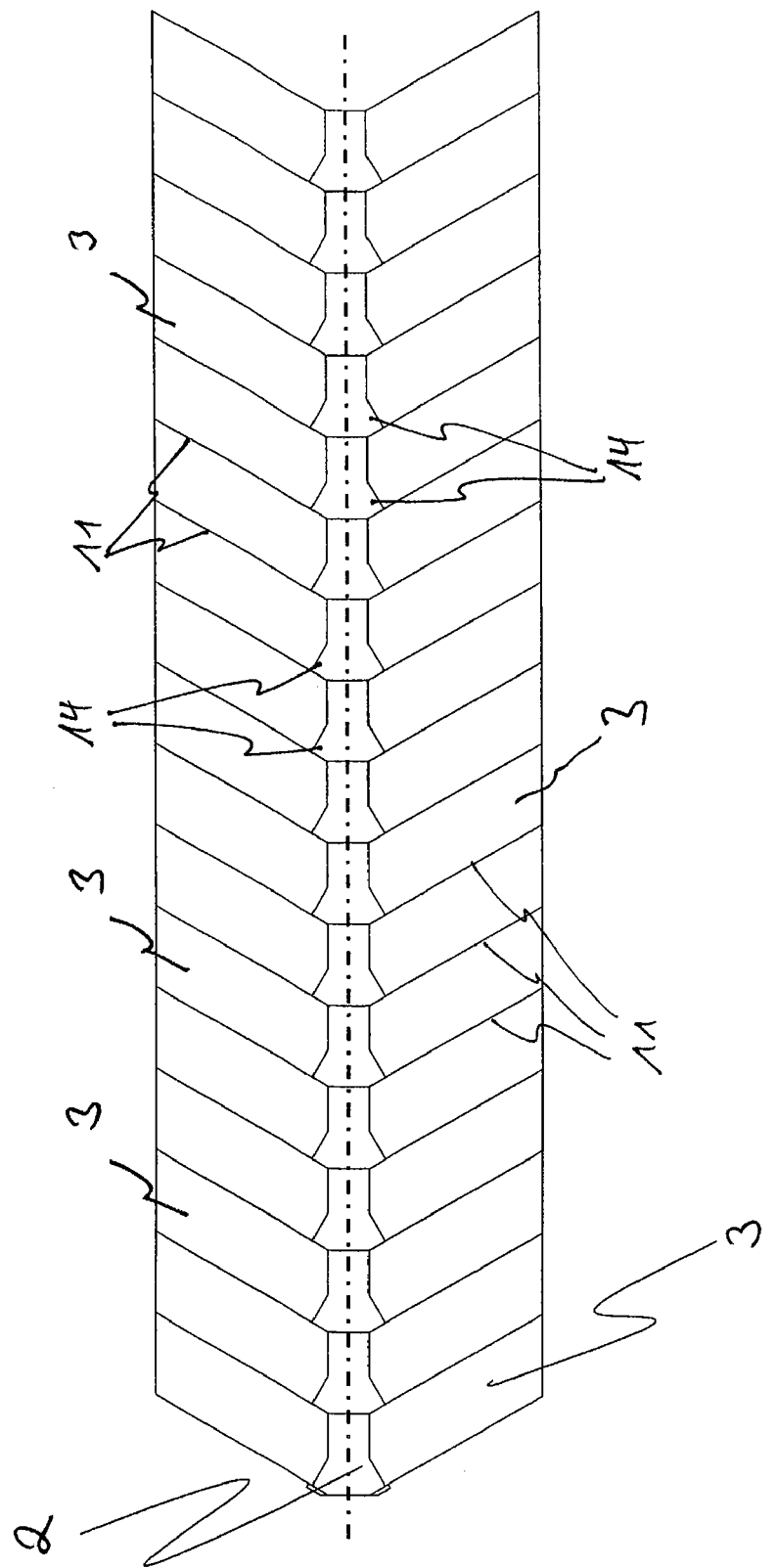
FIG. 4 shows a plan view of the resting deck.

As may be seen clearly from FIG. 4, the individual resting compartment 3 are arranged slanted with their longitudinal directions relative to the longitudinal direction of the aircraft fuselage or the longitudinal direction of the access aisle 2, which is formed by both rows of side-by-side arranged, longitudinally extending resting compartments 3. In FIG. 4, therefore, the fishbone-like arrangement of the resting compartments 3 may be particularly recognized, which is attributed to the fact that the resting compartments 3 are arranged on both sides of the access aisle 2 respectively at a positive or negative acute angle to the longitudinal direction of the access aisle 2, whose angle in the exemplary embodiment of FIG. 4 amounts to approximately +62° or −62°.

As seen from FIGS. 2 and 4, in addition, the resting compartments 3 have front sides facing the access aisle 2, which in combination with one another, define the access aisle 2. The front sides 13 of the resting compartments 3, in this connection, have a section, which runs parallel to the longitudinal direction of the aircraft fuselage. In addition, the front sides 13 have a section that is angled to the noted parallel section, which does not run parallel to the longitudinal direction of the aircraft fuselage, whereby in the regions of these angled sections, partial widening 14 of the access aisle 2 exist, so that at these places, two passengers may pass effortlessly. Alternatively, the so-formed niches 14 also may be used for dressing and undressing by the passengers. Indeed, it is also possible to arrange the resting cabins 3 on both sides of the access aisle 2 offset from one another; however, the aisle 2 would widen only on one side; in one example, the aisle 2 would meander only at a constant width along the front sides of the resting compartments 3, whereby no gained space would exist for widening. In order to avoid this, the resting compartments 3 should be arranged non-offset or in pairs, as shown in FIG. 4, so that each resting compartment on one side of the access aisle 2 may be associated with another resting compartment 3 on the other side of the access aisle. With this type of paired arrangement, widenings are positioned on both sides of the access aisle on opposite points of the access aisle, so that at these positions, a quasi-doubled widening of the access aisle 2 exists.

The resting compartments 3 may be for example supplied as pre-manufactured cage-like housings, in which the separating walls 11 as well as the resting surfaces 12 are provided as one-piece structures in the shape of the resting compartment 3 itself. In this manner, a very time-saving installation of the resting compartments 3 in the crown or top area of the aircraft fuselage 8 is possible, allowing for a modular construction method. In order to make the resting deck 10 accessible for passengers, subsequently, flooring 5 may be installed to be lower relative to the resting surfaces 12 via a trough-like component, such that the flooring 5 is placed lower relative to the resting surfaces 12 and the passengers may offhand move upright in the access aisle 2.

As shown in FIG. 1, the resting surfaces 12 simultaneously form at least partially a region of the underside of the ceiling of the main passenger cabin 9, on which luggage bins 4 are arranged for storing carry-on baggage laterally to the aircraft fuselage as well as to the center in the region of the recessed flooring 5 of the access aisle 2.

As may be seen from the previously described embodiments, by means of the slanted arrangement of the resting compartments, an optimal use of the existing available space in the crown or top region is permitted, without having to form the access aisle between two opposite rows of resting compartments too narrowly. At the same time, the fishbone-like arrangement of the resting compartments 3, as may be seen particularly well in FIG. 4, enables a passenger in a resting compartment 3 to see only in a very limited manner into the opposite resting compartment, so that privacy of the passengers may be maintained the best possible.

In addition, it should be noted that "including" does not exclude other elements or steps and "a" or "one" does not exclude a plurality. Further, it should be noted that features or steps, which have been described with reference to one of the above exemplary embodiments, also may be used in combination with other features or steps of other above-described exemplary embodiments. Reference numerals in the claims are not to be viewed as limitations.

Alternative combinations and variations of the examples provided will become apparent based on the disclosure. It is not possible to provide specific examples for all of the many possible combinations and variations of the embodiments described, but such combinations and variations may be claims that eventually issue.

| REFERENCE NUMERAL LIST | |
|---|---|
| 1 | Frame |
| 2 | Access aisle |
| 3 | Resting compartment |
| 4 | Head Rack |
| 5 | Floor |
| 6 | Longitudinal aisles |
| 7 | Lateral lining |
| 8 | Aircraft fuselage |
| 9 | Main passenger cabin |
| 10 | Resting deck |
| 11 | Separating wall |
| 12 | Resting surface |
| 13 | Front side of the resting compartment |
| 14 | Widening of the access aisle |

What is claimed is:

1. A resting deck in an aircraft fuselage having a longitudinal fuselage axis extending in the direction of travel, comprising:
a plurality of longitudinally extending resting compartments, arranged side-by-side, and defined on at least one of two opposite longitudinal sides by a separating barrier, separating one of the plurality of resting compartments from an adjacent one of the plurality of resting compartments;
a longitudinal resting surface arranged in each of the plurality of resting compartments, such that a longitudinal side of the resting surface extends along a longitudinal direction of the separating barrier;
the plurality of resting compartments are fixedly arranged having a slanting angle between a direction parallel to the longitudinal direction of the separating barrier and the longitudinal fuselage axis in a forward direction, and the slanting angle is selected in a range between 30° and 80°; and
an access aisle with a floor, the access aisle arranged along a centre of the longitudinal fuselage axis between inboard luggage bins of the main passenger cabin, wherein the inboard luggage bins are disposed on the underside of a ceiling of a main passenger cabin on both sides of the access aisle below the plurality of resting compartments and above a plurality of inboard rows of seats, wherein the plurality of the longitudinally extending resting compartments are arranged in two rows separated from one another by the access aisle.

2. An aircraft, comprising a fuselage, a main passenger cabin deck and a resting deck of claim 1 disposed above the main passenger cabin deck.

3. The aircraft of claim 2, wherein the plurality of the longitudinally extending resting compartments are fixedly arranged in a fishbone arrangement, such that the first of the two rows of the plurality of longitudinally extending resting compartments being disposed on a first side of the access aisle and a second of the two rows of the plurality of longitudinally extending resting compartments disposed on a second side of the access aisle opposite of the first side of the access aisle obscure the view from one of the plurality of longitudinally extending resting compartments into another of the plurality of longitudinally extending resting compartments.

4. The aircraft of claim 3, wherein a front side of at least one of the plurality of longitudinally extending resting compartments facing the aisle has a portion angled to the fuselage axis, such that a widening of the access aisle is defined by the portion angled to the fuselage axis.

5. The resting deck of claim 1, wherein the plurality of the longitudinally extending resting compartments are fixedly arranged in a fishbone arrangement, such that the first of the two rows of the plurality of longitudinally extending resting compartments being disposed on a first side of the access aisle and a second of the two rows of the plurality of longitudinally extending resting compartments disposed on a second side of the access aisle opposite of the first side of the access aisle obscure the view from one of the plurality of longitudinally extending resting compartments into another of the plurality of longitudinally extending resting compartments.

6. The resting deck of claim 5, wherein a front side of at least one of the plurality of longitudinally extending resting compartments facing the aisle has a portion angled to the fuselage axis, such that a widening of the access aisle is defined by the portion angled to the fuselage axis.

* * * * *